United States Patent
Hobbs

[15] 3,656,911
[45] Apr. 18, 1972

[54] CONTROL SYSTEM FOR HYDROGENATION REACTIONS

[72] Inventor: James W. Hobbs, Bartlesville, Okla.
[73] Assignee: Phillips Petroleum Company
[22] Filed: June 8, 1970
[21] Appl. No.: 44,037

[52] U.S. Cl..................23/253 A, 23/230 A, 235/151.12, 260/683.9, 260/690, 260/699, 260/700
[51] Int. Cl..........................................................C07b 1/00
[58] Field of Search...........23/230, 232, 253, 254, 230 A, 23/253 A; 260/679, 683.9, 690, 699, 700; 235/151.12

[56] References Cited

UNITED STATES PATENTS

| | | |
|---|---|---|
| 3,080,219 | 3/1963 | Harvey, Jr. ...........................23/253 |
| 3,257,375 | 6/1966 | Norwood ..........................260/700 X |
| 3,276,843 | 10/1966 | Cooper, Jr. ..........................23/230 A |
| 3,392,088 | 7/1968 | Johnson................................203/1 |

Primary Examiner—Morris O. Wolk
Assistant Examiner—R. E. Serwin
Attorney—Young & Quigg

[57] ABSTRACT

A control system for a selective hydrogenation reaction computes the desired feed input temperature to the reactor in response to measurements of flow rate and analyses of the inlet and effluent streams. The temperature of the feed stream is regulated in response to a comparison of the computed temperature with a measured temperature of the feed stream.

6 Claims, 2 Drawing Figures

INVENTOR.
J. W. HOBBS
BY Young & Quigg
ATTORNEYS

CONTROL SYSTEM FOR HYDROGENATION REACTIONS

In many exothermic chemical reactions it is necessary to control temperature within certain limits in order to maintain satisfactory yields and to prevent side reactions. This is particularly true in selective hydrogenation processes. For example, ethylene is commonly produced by the thermal cracking of hydrocarbon feed stocks. Unfortunately, some acetylene is also produced, and must be removed for many applications. This can be accomplished by selective catalytic hydrogenation of the acetylene.

In selective hydrogenation operations of this type, it is quite important to maintain the operating temperature within narrow limits. If the temperature is too low, the hydrogenation reaction is not carried out in a sufficiently complete manner to remove the acetylene. If the temperature becomes too high, side reactions such as the hydrogenation of ethylene and the formation of polymers may result. It is also very important to prevent excessive temperatures from being reached because of the danger of explosions.

In accordance with this invention, a control system is provided which is particularly adapted for use in selective hydrogenation reactions. The control is based on a combination of feed-forward and feed-back control loops. In a feed-back loop, the temperature of the feed stream to the reactor is regulated in response to a measured temperature of the stream downstream of a heat exchanger. The set point of the temperature controller is regulated in response to a computation of the expected temperature rise in the reactor. This computation is based on measurements of acetylene concentrations in the feed and in the reactor effluent and the rate of flow of the feed stream. In accordance with another feature of this invention, temperature limits are imposed to prevent excessive temperature rises.

In the accompanying drawing.

Figure 1:
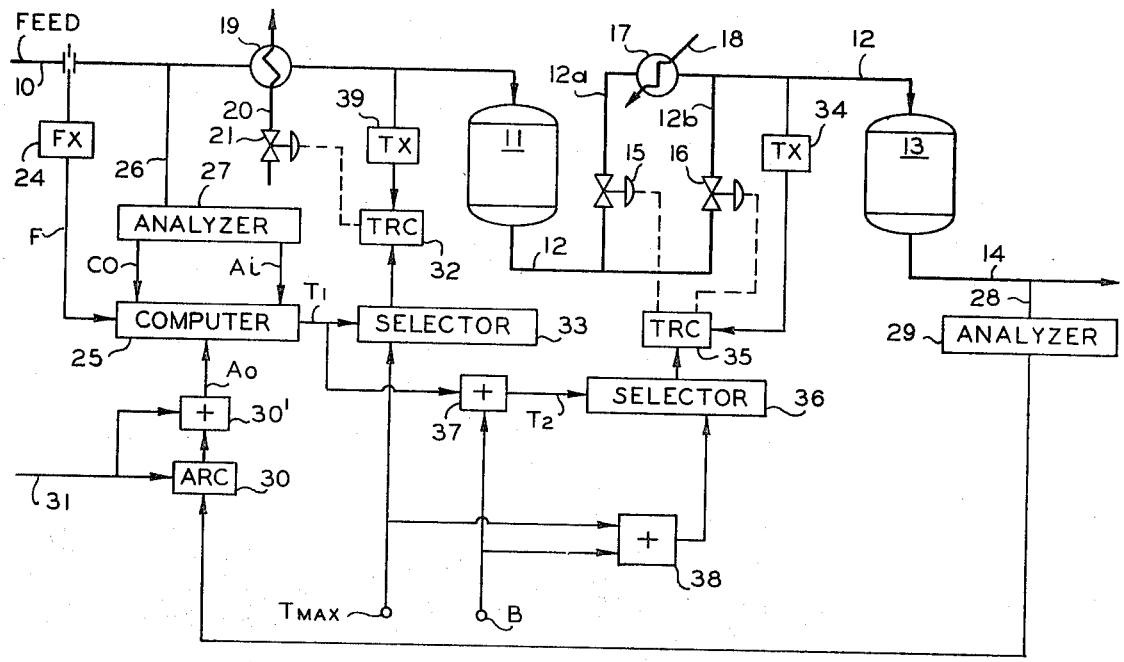
FIG. 1 is a schematic representation of the control system of this invention applied to an exothermic selective hydrogenation process.

Referring now to the drawing in detail and to FIG. 1 in particular, there is shown a conventional system for the selective hydrogenation of acetylene in an ethylene stream. Such a stream is introduced through a conduit 10 which communicates with the inlet of a first reactor 11 that contains hydrogenation catalyst. The outlet of reactor 11 is connected by a conduit 12 to the inlet of a second reactor 13 which also contains hydrogenation catalyst. The effluent from reactor 13 is removed through a conduit 14. Conduit 12 includes branched parallel conduits 12a and 12b which have respective control valves 15 and 16 therein. A heat exchanger 17 is associated with conduit 12a. A coolant is passed through exchanger 17 by a conduit 18. A heat exchanger 19 is associated with feed conduit 10. A heating medium is passed through exchanger 19 by a conduit 20 which has a control valve 21 therein. The apparatus thus far described constitutes a conventional selective hydrogenation system. Such a system can be operated in accordance with the disclosures of U.S. Pats. Nos. 2,802,889, 2,814,653 or 3,113,980, for example.

In accordance with this invention, the temperatures of the feed streams introduced into the two reactors are controlled in response to temperature and flow measurements and analyses of the feed and effluent streams. The rate of flow of feed is measured by a flow meter associated with conduit 10. A flow transmitter 24 establishes an output signal F which is representative of this rate of flow. Signal F is applied to the input of a computer 25. A sample of the feed stream is withdrawn from conduit 10 through a conduit 26 which communicates with an analyzer 27. This analyzer can be a chromatographic analyzer, for example. Analyzer 27 establishes two output signals $A_i$ and $CO$ which are representative of the concentrations of acetylene and carbon monoxide, respectively, in the feed stream. These two signals are also applied to computer 25. A sample of the effluent stream removed through conduit 14 is passed by a conduit 28 to a second analyzer 29, which can also be a chromatographic analyzer. The output signal from analyzer 29, which is representative of the concentration of acetylene in the effluent stream, is applied to the input of a controller 30. Controller 30 receives a set point signal 31 which is representative of the desired acetylene concentration of the effluent stream. It is desirable to maintain this concentration below some preselected (set point) value. Controller 30 compares the two input signals and establishes an output signal which is representative of any difference between the measured concentration of the desired set point value. This difference signal is applied to a summing device 30 which also receives a set point signal 31. The resulting output signal $A_o$ is applied to computer 25.

A temperature measuring device is associated with conduit 10 downstream of heat exchanger 19. A temperature transducer 39 establishes an output signal which is representative of this measured temperature. This signal is applied to the input of a temperature controller 32. As will be explained hereinafter in greater detail, computer 25 establishes an output signal $T_1$ which is applied to the first input of a selector 33. A reference signal $T_{max}$ is applied to a second input of selector 33. Selector 33 transmits the smaller of the two input signals to the set point of a controller 32. Controller 32 compares the measured temperature with the set point value transmitted by selector 33 and provides an output signal representative of any difference therebetween. This signal controls valve 21 to adjust the flow of heating material through heat exchanger 19.

A temperature sensing element is associated with conduit 12 downstream of heat exchanger 17. A temperature transmitter 34 establishes an output representative of the measured temperature and applies this signal to the input of a temperature controller 35. The set point signal to controller 35 is received from a selector 37. Signal $T_1$ is applied to the first input of a summing device 37. A reference signal B is applied to the second input of summing device 37. The output of device 37 is applied to the first input of selector 36. Signals $T_{max}$ and B are applied to the respective inputs of a second summing device 38. The output of device 38 is the second input of selector 36. Selector 36 passes the smaller of the two input signals to the set point of controller 35. Controller 35 regulates valves 15 and 16 to adjust the relative flows through conduits 12a and 12b so as to control the temperature of the feed stream introduced into reactor 13.

Figure 2:
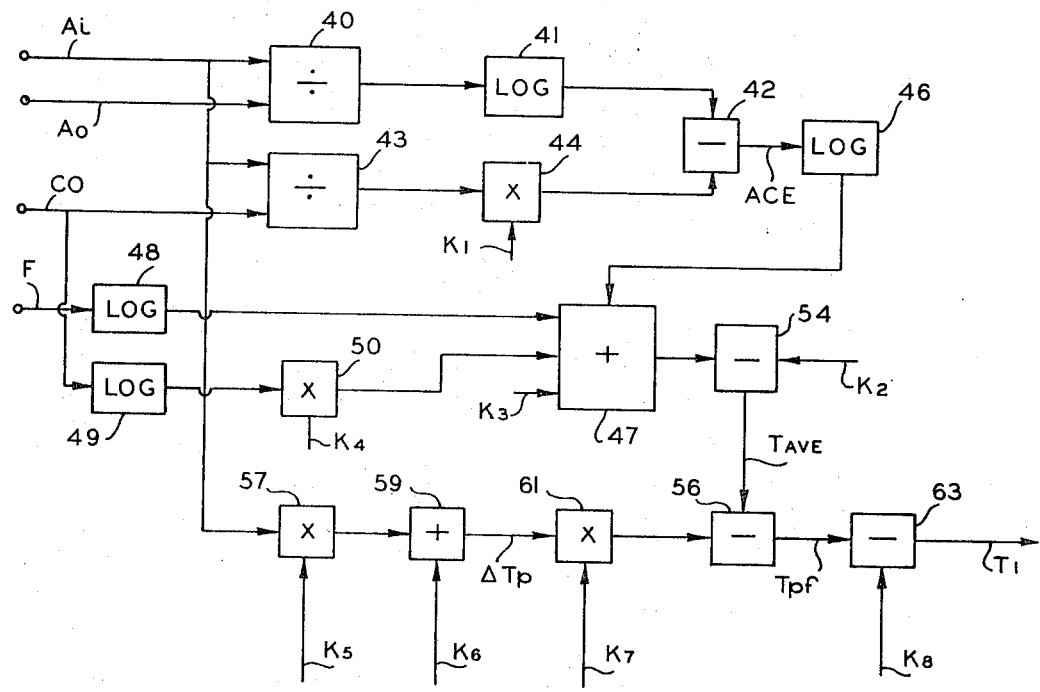
FIG. 2 is a schematic representation of an embodiment of the computer employed in the control system of FIG. 1.

Computer 25 is illustrated schematically in FIG. 2. Output signal $T_1$ is computed from the following six equations:

$$ACE = \log_e (A_i/A_o) - K_1 (A_i/CO) \qquad (1)$$

where $ACE$ is an acetylene factor and $K_1$ is a constant. Since carbon monoxide acts as a catalyst poison, the signal $CO$ must be considered.

$$T_{ave} = \frac{K_2}{K_3 - \log_e ACE - \log_e F - K_4 \log_e CO} \qquad (2)$$

where $T_{ave}$ is the predicted average temperature of the two reactors and $K_2$, $K_3$ and $K_4$ are constants.

$$\Delta T_p = K_5 A_i + K_6 \qquad (3)$$

where $\Delta T_p$ is the predicted temperature differential across the two reactors and $K_5$ and $K_6$ are constants.

$$T_{pf} = T_{ave} - K_7 \Delta T_p \qquad (4)$$

where $T_{pf}$ is the predicted average feed temperature to the first reactor and $K_7$ is a constant.

$$T_1 - T_{pf} - K_8 \qquad (5)$$

where $T_1$ is the computed temperature set point for reactor 11 and $K_8$ is a constant.

$$T_2 - T_1 + B \qquad (6)$$

where $T_2$ is the computed temperature set point for reactor 13 and B is a constant representative of a desired difference in temperature of the feed to the two reactors. If it should be desirable to operate both reactors at the same temperature, B is zero.

The various constants of the foregoing equations can be determined by routine tests and trial and error procedures to obtain values which give the best approximation of the desired feed temperature and control in a given reactor system.

In order to solve equation (1), signals $A_1$ and $A_o$ are applied to the respective inputs of a divider 40 in FIG. 2 wherein signal $A_1$ is divided by a signal $A_o$. The resulting quotient is applied through a logarithmic network to the first input of a subtracting device 42. Signals $A_1$ and $CO$ are applied to the respective inputs of a second divider 43 wherein signal $A_i$ is divided by signal $CO$. The resulting quotient is applied to the first input of a multiplier 44. A reference signal $K_1$ is applied to the second input of multiplier 44. The output product signal is applied to the second input of subtractor 42 wherein it is subtracted from the output signal of network 41. The difference output signal ACE represents the acetylene factor of equation (1).

In order to solve equation (2), signal $ACE$ is applied through a logarithmic network 46 to the first input of a summing device 47. A reference signal $K_3$ constitutes the second input to summing device 47. Input signal F is applied through a logarithmic network 48 to the third input of summing device 47. Input signal $CO$ is applied through a logarithmic network 49 to the first input of a multiplier 50. The second input to multiplier 50 is a reference signal $K_4$. The resulting product constitutes the fourth input to summing device 47. A reference signal $K_2$ is applied to a divider 54 as the numerator input. The output of summing device 47 is applied as the denominator input to divider 54. Summing device 47 is arranged to subtract the second, third and fourth input signals from signal $K_3$ to provide a signal representative of the denominator of equation (2). The output signal from divider 54 thus constitutes the predicted average reactor temperature of $T_{ave}$ of equation (2).

In order to solve equation (3), signal $A_i$ and a reference signal $K_5$ are applied to the respective inputs of a multiplier 57. The resulting product is applied to the first input of a summing device 59. A reference signal $K_6$ constitutes the second input to summing device 59. The resulting sum is representative of the predicted total temperature differential $\Delta T_p$ across the reactors.

In order to solve equation (4), the signal $\Delta T_p$ is applied to the first input of a multiplier 61. A reference signal $K_7$ is applied to the second input of multiplier 61. The output signals of divider 54 and multiplier 61 are applied to the respective inputs of a signal subtractor 56 to provide an output signal which represents the predicted average reactor feed temperature of $T_{pf}$. This signal is applied to the first input of a subtractor 63 wherein a reference signal $K_8$ is subtracted to provide the output signal $T_1$ of equation (5).

Computer 25 can be either a digital computer or an analog computer. If a digital computer is employed, the analog input signals from the temperature and flow transmitters and the signals from the analyzers are converted to digital form by appropriate analog-to-digital converters. The resulting output signal from the computer is converted to analog form to be applied to the set point inputs of the controllers. If the computer is in analog form, either conventional electrical or pneumatic elements can be employed to perform the indicated operations.

Selector 33 is employed to prevent the temperature of the feed to reactor 11 from exceeding a maximum set point value. Similarly, selector 36 prevents the temperature of the feed to reactor 13 from exceeding a second maximum set point value established by summing device 38. Signals $T_{max}$ and $B$ can be established by potentiometers if electrical control elements are employed. Similarly, pneumatic transducers can be utilized if pneumatic control elements are employed. These maximum limits prevent excessive temperatures from occurring in the event of a malfunction in the control system. Although the invention has been described in conjunction with a hydrogenation system employing two reactors in series, the invention can be employed in a system using only one reactor or in a system using more than two reactors.

While this invention has been described in conjunction with presently preferred embodiments, it obviously is not limited thereto.

What is claimed is:

1. In a system wherein a first constituent of a fluid mixture is hydrogenated by passing the fluid mixture through a reactor that contains a hydrogenation catalyst; control apparatus comprising:
    means to measure the temperature of the fluid mixture introduced into the reactor and establish a first signal representative thereof;
    means to measure the concentrations of said first constituent in the fluid mixture introduced into the reactor and in the effluent from the reactor and establish respective second and third signals representative thereof;
    means to measure the rate at which the fluid mixture is passed through the reactor and establish a fourth signal representative thereof;
    means responsive to said second, third and fourth signals to compute a predicted temperature at which the fluid mixture should be introduced into the reactor in order to maintain said third signal below a preselected value, and establish a fifth signal representative of such predicted temperature;
    means to compare said fifth signal with said first signal and establish a sixth signal representative of any difference therebetween; and
    means responsive to said sixth signal to regulate the temperature of the fluid mixture introduced into the reactor.

2. The apparatus of claim 1, further comprising selector means adapted to receive two input signals and to transmit the smaller of such signals, means to apply said fifth signal to one of the inputs of said selector means, means to apply a reference signal of predetermined magnitude to the second input of said selector means, and means to apply the output of said selector means to said means to compare in place of said fifth signal.

3. The system of claim 1 wherein said reactor comprises first and second chambers in series, each containing hydrogenation catalyst, and means to direct the effluent from the first chamber through a heat exchanger means before entering said second chamber; and further comprising means to measure the temperature of the feed introduced into the second chamber and establish a seventh signal representative thereof; means to add a reference signal to said fifth signal to establish an eighth signal; second means to compare said seventh and eighth signals and establish a ninth signal representative of any difference therebetween; and means responsive to said ninth signal to regulate said heat exchanger.

4. The apparatus of claim 3, further comprising selector means adapted to receive two input signals and to transmit the smaller of such signals, means to apply said eighth signal to one of the inputs of said selector means, means to apply a reference signal of predetermined magnitude to the second input of said selector means, and means to apply the output of said selector means to said second means to compare in place of said eighth signal.

5. The apparatus of claim 1, further comprising means to measure the concentration of a constituent in the fluid mixture which tends to poison the hydrogenation catalyst and establish a seventh signal representative of such concentration, and means to apply said seventh signal to said means to compute to compensate for the catalyst poison present in the feed mixture.

6. The apparatus of claim 5 wherein said means to compute comprises means to solve the following equations to determine $T_1$:

$$T_1 = T_{pf} - K_8$$
$$T_{pf} = T_{ave} - K_7 \Delta T_p$$
$$\Delta T_p = K_5 A_i + K_6$$

$$T_{ave} = \frac{K_2}{K_3 - \log_e ACE - \log_e F - K_4 \log_e CO}$$

$$ACE = \log_e (A_i/A_o) - K_1 (A_i/CO)$$

where $A_i$ is said second signal, $A_o$ is said third signal, $F$ is said fourth signal, $CO$ is said seventh signal, $T_1$ is said fifth signal, and the $K$s are constants.

* * * * *